United States Patent [19]
North

[11] Patent Number: 5,884,667
[45] Date of Patent: Mar. 23, 1999

[54] VARIABLE FLOW RESTRICTING DEVICES

[75] Inventor: Alan David North, Reading, England

[73] Assignee: Cistermiser Limited, Berkshire, England

[21] Appl. No.: 693,113
[22] PCT Filed: Feb. 22, 1995
[86] PCT No.: PCT/GB95/00379
§ 371 Date: Aug. 21, 1996
§ 102(e) Date: Aug. 21, 1996
[87] PCT Pub. No.: WO95/22710
PCT Pub. Date: Aug. 24, 1995

[30] Foreign Application Priority Data

Feb. 22, 1994 [GB] United Kingdom ............ 9403354

[51] Int. Cl.$^6$ ............................................. F15D 1/00
[52] U.S. Cl. ........................... 138/43; 138/45; 138/46
[58] Field of Search ..................... 138/43, 45, 46, 138/42

[56] References Cited

U.S. PATENT DOCUMENTS

| | | | | |
|---|---|---|---|---|
| 1,797,280 | 3/1931 | Zerk | ............................... | 138/42 |
| 2,777,464 | 1/1957 | Mosely | ............................ | 138/46 |
| 3,267,918 | 8/1966 | Ayres | ............................. | 138/42 |
| 3,470,915 | 10/1969 | Bitzer et al. | ...................... | 138/43 |
| 3,552,444 | 1/1971 | Levesque | .......................... | 138/46 |
| 4,011,893 | 3/1977 | Bentley | ............................ | 138/43 |
| 4,098,850 | 7/1978 | Tamura | ............................. | 138/46 |
| 4,344,459 | 8/1982 | Nelson | ............................. | 138/43 |

FOREIGN PATENT DOCUMENTS

| | | |
|---|---|---|
| 2407049 | 8/1974 | Germany . |
| 2727153 | 12/1978 | Germany ................................. 138/45 |
| 1011141 | 11/1965 | United Kingdom . |
| 1331141 | 9/1973 | United Kingdom . |
| 1386417 | 3/1975 | United Kingdom . |
| 1442718 | 7/1976 | United Kingdom . |
| 1498178 | 1/1978 | United Kingdom . |
| 1542834 | 3/1979 | United Kingdom . |
| 2049106 | 12/1980 | United Kingdom . |
| 1600480 | 10/1981 | United Kingdom . |
| 1601560 | 10/1981 | United Kingdom . |
| 2186949 | 8/1987 | United Kingdom . |

*Primary Examiner*—David Scherbel
*Assistant Examiner*—James F. Hook
*Attorney, Agent, or Firm*—Tarolli, Sundheim, Covell, Tummino & Szabo

[57] ABSTRACT

A variable flow restricting device comprises a part (12) having a groove (14) provided in a face (18) thereof and a through-passage (20) communicating with the groove. The device further comprises a covering structure (22) for engaging the face (18) to cover the groove (14) and thereby define a flow path which extends from the through-passage (20) in communication therewith. Covering of the groove is facilitated by a structure (26) for providing relative displacement between the part (12) and the covering structure (22) for causing resilient deformation of the covering structure and/or the part (12) to provide adjustably variable covering of the groove. The flow path extends from the through-passage (20) to an extent which is adjustably variable according to relative displacement of the part (12) and the covering structure.

24 Claims, 2 Drawing Sheets

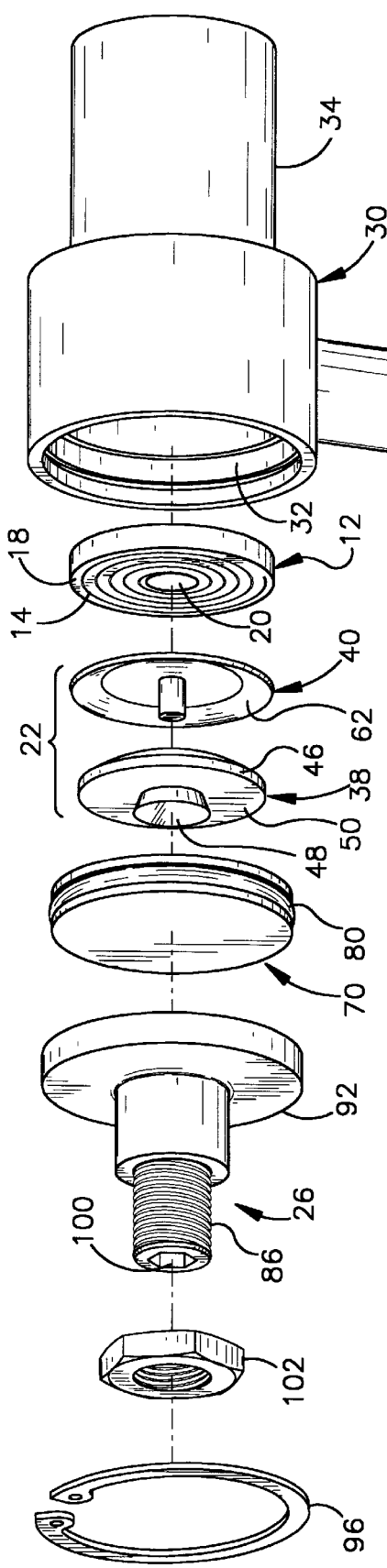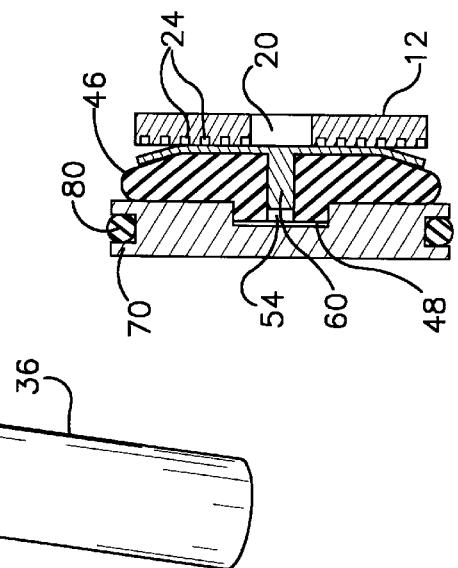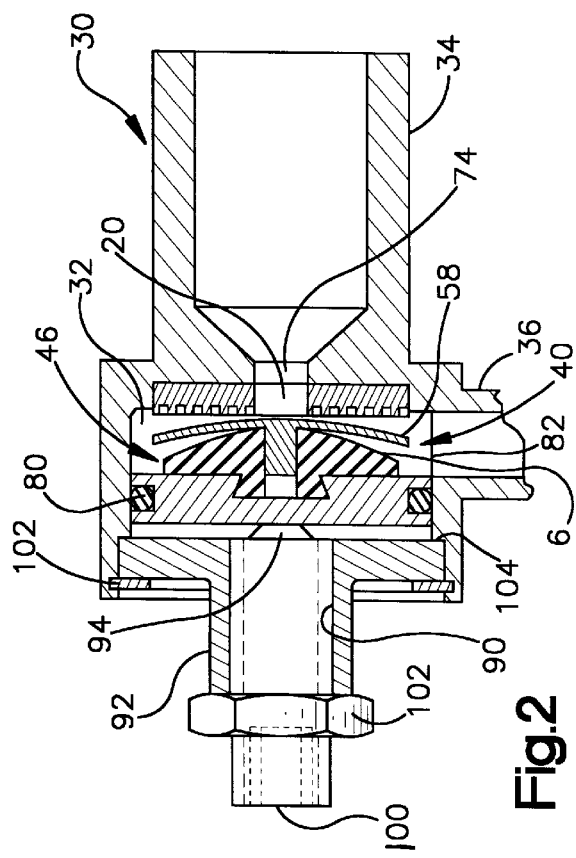

VARIABLE FLOW RESTRICTING DEVICES

The invention relates to devices for variably restricting the flow of fluids in which flow resistance is varied by varying the length of a flow path defined by the device.

It is known to provide flow restricting devices in which the flow resistance is varied by varying the length of a flow path defined therethrough rather than by reducing the cross-sectional area of the flow path, as is the case with a tapering needle and orifice for example. An advantage of not reducing the flow path cross-sectional area is that the likelihood of the device becoming blocked by debris or lime scale is reduced. Additionally, it is possible by placing upstream of the device a filter having a pore size smaller than the flow path section area to ensure that particles entrained in the fluid which reach the device will generally not be of sufficient size to cause a blockage.

In a known flow restricting device having a variable length flow path, an axially extending helical groove is provided which can be selectively covered by relative axial movement between the part defining the groove and a suitable cover to provide a flow path, or passage, having a length which is variable. A disadvantage with such devices is that they are not economical with space due to the requirement for axial movement and may not be suitable for applications where space is limited.

One object of the invention is to provide an improved variable flow restricting device which can be made compact.

Accordingly, the invention provides a variable flow restricting device comprising a part having groove means provided in a face thereof and through-passage means communicating with said groove means, covering means for engaging said face for covering said groove means to define flow path means which extend from said through-passage means in communication therewith, and means for providing relative displacement between said part and said covering means for causing resilient deformation of said covering means and/or said part to provide adjustably variable covering of said groove means such that said flow path means extends from said through-passage means to an extent which is adjustably variable according to said relative displacement.

The invention also includes a variable flow restricting device including parts cooperable together to form a flow path extending progressively radially outwardly from an inlet defined in at least one of the parts and means for progressively controlling the degree of cooperation between said parts for progressively varying the length of said flow path from said inlet.

The invention additionally includes a valve apparatus comprising a variable flow restricting apparatus as defined in either one of the last two preceding paragraphs.

The covering means may be disposed between said displacement providing means and said face so as to be displaceable by said displacement providing means.

Preferably, the covering means comprises a resiliently deformable member and a resilient membrane disposed between said deformable member and said face.

Preferably, the deformable member comprises a dome-shaped portion having a generally convex face directed toward said resilient membrane and the membrane includes a generally convex face directed toward said face of said part. In which case, the radius of curvature of said convex face of the deformable member is preferably smaller than the radius of curvature of said convex face of said resilient membrane.

The deformable member may comprise means for mutually slideably engaging with said resilient membrane.

The deformable member may be mounted on a relatively rigid moveable member.

The displacement means may engage said moveable member.

Preferably, the deformable member comprises a polymeric material.

Advantageously, the polymeric material is a rubber.

Preferably, the face of the part is flat and the groove means comprises a spiral groove extending radially outwardly from said through-passage means.

The part may be relatively rigid so as to be substantially non-deformable when the face thereof is engaged by said covering means.

The part may be fixedly mounted in a housing, such as a housing of a valve apparatus.

BRIEF DESCRIPTION OF THE DRAWINGS

In order that the invention may be well understood, an embodiment thereof, which is given by way of example only, will now be described with reference to the accompanying drawings, in which:

FIG. 1 is an exploded perspective view of a variable flow restricting device;

FIG. 2 is a sectional view of the device of FIG. 1 in an assembled condition;

FIG. 3 is an enlargement of a portion of FIG. 2 showing an increased flow resistance condition;

DETAILED DESCRIPTION OF THE DRAWINGS

Figure 4:
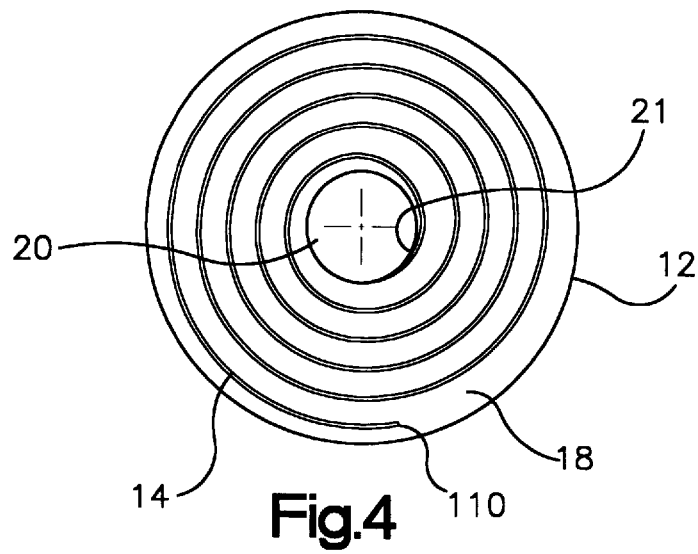
FIG. 4 is a plan view showing groove means provided in a part of the FIG. 1 device.

Referring to FIGS. 1 to 4, a variable flow restricting device comprises a part 12 having groove means 14 provided in a face 18 thereof and through-passage means 20 communicating with the groove means, covering means 22 for engaging the face 18 for covering the groove means 14 to define flow path means 24 which extend from said through-passage means in flow communication therewith, and means 26 for providing relative displacement between the part 12 and the covering means 22 for causing resilient deformation of the covering means to provide adjustably variable covering of the groove means 14 such that the flow path means 24 extends from said through-passage means 20 to an extent which is adjustably variable according to said relative displacement.

In FIG. 2, the device is assembled in a housing 30 for applications where a flow restrictor is required on the end of a pipe. The housing 30 comprises a chamber 32 in which the part 12 and covering means 22 are housed, an inlet end 34 for connection to a pipe and an outlet end comprising a discharge pipe 36.

The part 12 is a relatively rigid disc which is fixably mounted in the housing 30. The face 18 of disc 12 is substantially flat and the groove means 14, as best seen in FIG. 4, is in the form of a spiral groove extending progressively radially outwardly from the through-passage means 20. The through-passage means comprises a through-aperture 20 which is aligned with the central axis of the disc 12 and communicates at its downstream end with the radially inner end 21 of the spiral groove 14.

The covering means 22 is disposed opposite the face 18 of disc 12 and comprises a resiliently deformable member 38 and a resilient membrane 40 which is disposed between the face 18 and the deformable member 38. The deformable member 38 comprises a dome-like portion 46, a spigot 48 extending from a back face 50 of the dome-like portion and a centrally located through-aperture 54. The resilient membrane 40 comprises a generally convex face 58 which is directed toward the face 18 of part 12 and a centrally disposed shaft 60 which extends from a generally concave face 62 of the membrane. The shaft 60 is sized to be a sliding fit in the through-aperture 54 so that the deformable member 38 and resilient membrane 40 are mutually slideably engageable.

FIG. 2 shows the variable flow restricting device in a relatively low flow resistance condition wherein the covering means 22 is undeformed and spaced apart from the face 18. In this undeformed condition, the convex face 58 of the resilient membrane describes an arc having a radius of curvature which is less than that described by a convex face 64 of the dome-like portion 46.

The deformable member 38 is mounted by means of the spigot 48 on a relatively rigid moveable member 70 which is engaged by the displacement providing means 26. The arrangement is such that the covering means which is disposed between the displacement providing means and the fixably mounted disc 12 can be displaced relative to the disc.

The housing 30 has an inlet opening 74 disposed in the inlet end 34 which communicates with the chamber 32 via the through-passage means 20 of the disc. The moveable member 70 is adapted to be slideable in the chamber 32 and is provided with sealing means 80 around its peripheral edge so that fluid passing through the through-aperture 20 into the chamber 32 is constrained to flow to a chamber outlet 82 which communicates with the discharge pipe 36.

The displacement providing means comprises a screw-shaft 86 provided with external threading for engaging threading of a through-bore 90 in a mounting part 92. The mounting part 92 is disposed in the chamber 78 behind the moveable member 70 such that an end 94 of the screw-shaft 86 may bear on the moveable member and is retained in the chamber by means of a circlip 96 which holds the part 92 against a shoulder 104 of the housing 30. The screw-shaft 86 is provided with means by which it can be rotated so as to be moveable towards and away from the face 18 of part 12 for displacing the moveable member 70 and the covering means 22 mounted thereon relative to the disc 12. In the embodiment, the means for rotating comprises an aperture 100 which is shaped to receive a hexagonal wrench. A lock nut 102 is provided whereby the screw-shaft 86 can be locked in position so that a desired condition of the device once set by a user can be retained.

In use, the inlet end 34 of the housing is fitted to the end of a pipe (not shown) so that fluid can enter the device via the inlet opening 74 from where it flows through the through-aperture 20 before passing into the chamber 32 which it exits via the outlet 82. In the relatively lower flow resistance condition shown in FIG. 2, the fluid passes directly from the through-aperture 20, which defines a relatively short flow path, to the chamber 78. To increase the flow resistance, the screw-shaft 86, with the locknut 102 released, is rotated to drive the moveable member 70 inwardly of the chamber 32 displacing the covering means 22 relative to the disc 12 to bring the convex face 58 of the membrane 40 into engagement with the disc face 18. As the covering means is advanced towards the disc, the convex face 58 of the membrane 40 is pressed against the disc face 18 and deformed such that it acquires a flatter profile as shown in FIG. 3. The deformation of the membrane causes the covering and sealing of the spiral groove 14 to define flow path means 24 extending from the through-aperture 20 and having an extent determined by the relative displacement of the covering means. The greater the relative displacement of the covering means in the direction of the disc 12, the greater becomes the area of the convex face 58 which is flattened against the disc-part face 18 and therefore the greater is the length of the spiral groove 14 which is covered.

In this way, flow path means 24 having an extent which is adjustably variable according to the relative displacement between the covering means 22 and the disc 12 can be defined for varying the flow resistance of the device. As shown in FIG. 3, in a relatively higher flow resistance condition of the device, fluid flowing therethrough is constrained to flow along a relatively longer flow path (as compared with condition illustrated in FIG. 2) defined by the through-aperture 20 and the flow path means 24.

It will be noted that the curvature of the membrane 40 allows for a progressive covering of the spiral groove as the membrane is deformed against the disc face 18. Thus as the covering means is advanced towards the disc face 18, the membrane first covers the through-aperture 20 and then progressively covers the spiral groove 14; starting at the radially inner end 21 thereof and working toward the outer portions thereof as the deformation is increased. It will be appreciated that as the displacement of the covering means in the direction of the face 18 is increased a substantially greater extent of the spiral groove is covered at each advance. Thus, when the membrane is being deformed against portions of the face 18 in which the radially inner portion of the groove is defined, each increment of advance will produce a progressively increasing but relatively lower additional covering than when subsequently the periphery of the membrane is being pressed against the face, where the same increment of advance will provide a relatively greater additional covering. This covering characteristic of the device is such that the flow rate resistance is varied increasingly as the device is adjusted and this combined with the fact that a comparatively long spiral groove 14 can be defined on a relatively small face 18, allows the production of a relatively compact device suitable for use in fluid systems having widely differing pressures. For example, the device of the embodiment can readily be made suitable, in a single size, for use in systems, such as those operating from a pressurised water supply, having fluid pressures ranging from 0.1 to 10 Bar (10 to 1000 kN/m$^2$). Thus, a flow resistance device having a wide operating range can be provided in a single size so that it is not necessary to provide a range of sizes of the device to cover the pressures commonly encountered in fluid systems.

The deformable member 38 serves to ensure that the deformation of the membrane 40 is progressive as the covering means is displaced towards the disc 12. As the covering means is advanced and the membrane presses against the disc face 18, the dome-like portion 46 of the member 38 is gradually compressed between the moveable member 70 and the disc both of which are relatively rigid and substantially non-deformable. The compression of the dome-like portion 46 causes it to slide on the membrane shaft 60 and spread radially outwardly such that it gradually flattens against the concave face 62 of the membrane 40 pressing the membrane flat against the disc face 18. The dome-like portion is preferably made of a relatively soft polymer having sufficient resilience and rubbers have been found particularly suitable for this purpose.

If it is desired to reduce the flow restriction provided by the device, the covering means is displaced away from the disc 12 which reduces the compressive force acting on the dome-like portion. Being made of a resilient material, the dome-like portion will progressively resume its undeformed shape as the compressive force is reduced allowing the resilient membrane 40 to move away from the disc face 18 so as to uncover the spiral groove, whereby the extent of the flow path means 24 (and thus the length of the flow path through the device is reduced).

It will be understood that the range of control of the device is from the point at which the deformable member 38 is undeformed and the resilient membrane 40 is at its maximum distance away from the disc face 18 to the point where the screw-shaft 86 has (by means of the deformable member) flattened the membrane against the disc such that fluid has to flow through the full length of the covered spiral groove (the flow path defining means) to an open end 110 thereof.

It will be appreciated that it is not necessary that the relative displacement between the covering means and the part defining the groove means be provided by displacing the covering means. Alternatively the covering means may be retained in a fixed position with the part being displaced relative thereto. Also, if desired both the covering means and the part may both be moveable for relative displacement.

It is also envisaged that as one alternative to the described embodiment, the covering means could comprise a relatively rigid member and the groove means be provided in a deformable member which is resiliently deformed against the covering means to cover the groove means. This configuration is not preferred since the deformation would affect the section area of the flow path means defined by the covering. However, it will be readily appreciated that by selecting a suitable section shape for the undeformed groove means, the deformed section thereof cooperating to define the flow path extending from the through-passage means may be kept suitably unrestricted to avoid the disadvantages described in connection with known flow restricting devices in which the flow path cross-sectional area is varied.

It will be appreciated that the above-described variable flow restricting device includes parts cooperable together to form a flow path extending progressively radially outwardly from an inlet defined in at least one of the parts and means for progressively controlling the degree of cooperation between said parts for progressively varying the length of said flow path from said inlet.

Figure 5:
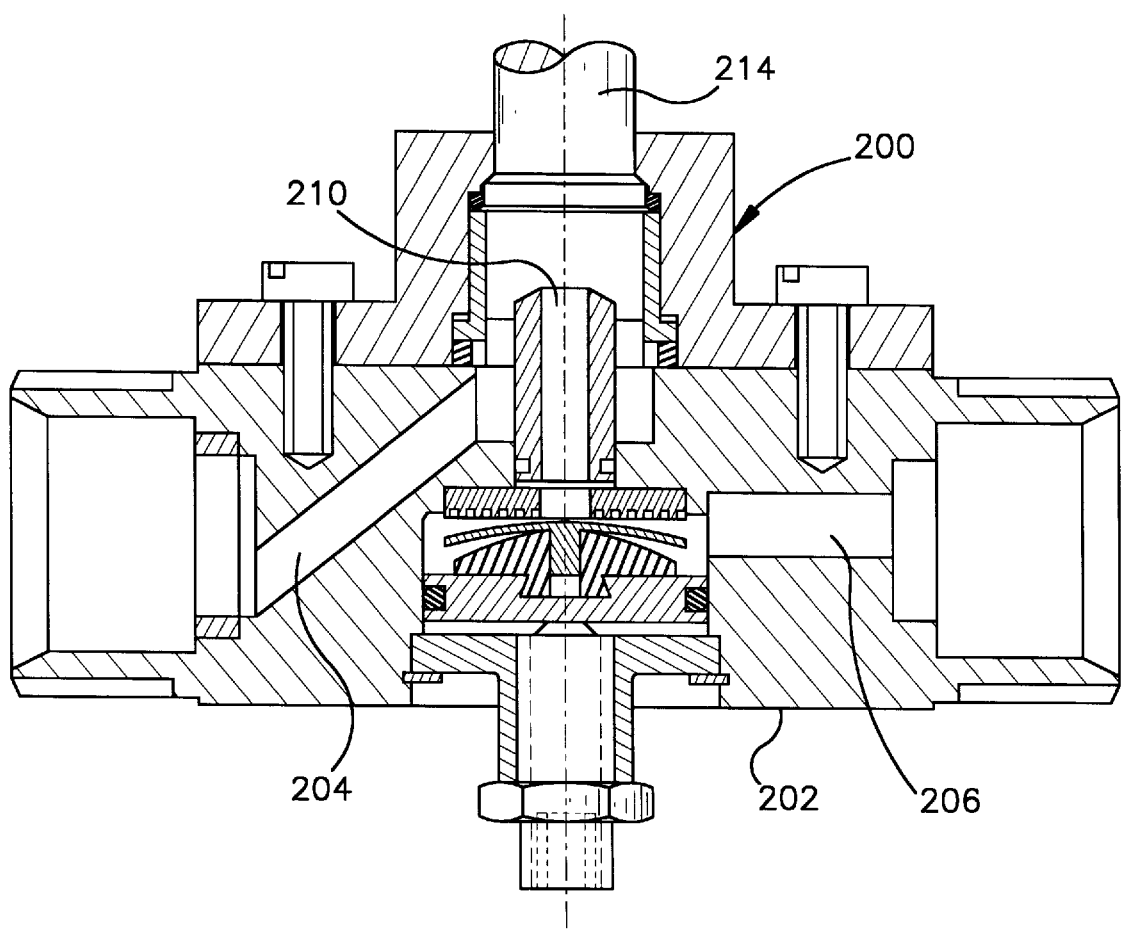
FIG. 5 is a section view of a valve apparatus comprising the variable flow restricting device of FIG. 1.

In FIG. 5, the variable flow restricting device is shown in an alternative application as part of a valve apparatus 200. The device in the valve 200 corresponds to that described with reference to FIGS. 1 to 4 and is operable in the same manner. Accordingly, where a like part is described hereinbelow, the same reference numeral will be used. The valve 200 is suitable for use in a flushing system and particularly for use in a flushing system for a urinal and will be described in connection with such use.

The valve 200 comprises a housing 202 having an inlet passage 204 and an outlet passage 206 disposed respectively upstream and downstream of the device housed therein. An orifice 210 disposed immediately upstream of the device communicates between the inlet passage 204 and the outlet passage 206 and may be selectively opened or closed by means of a control plunger 214 which is moved by electromagnetic means. Actuation of the control plunger 214 may be provided by suitable means such as a passive infra red detector arranged to detect the presence of a user of the urinal. Such a detector and a control system therefor is described in detail in the applicant's co-pending application No. 9215779.1 (publication No. 2268942) which is concerned with control apparatus for flushing systems.

With the control plunger 214 in an open position as shown in FIG. 5, water can flow through the inlet passage 204 and the orifice 210 to the outlet passage 208 via the through-aperture 20 of the device for filling a cistern, or cisterns, of a urinal flushing system. The variable flow restricting device can be used to control the rate of flow of water through the valve 200 in its open condition by varying the resistance to flow so that a desired rate of filling of the cistern(s) can be achieved. As previously mentioned, the pressures of fluids supplied to fluid systems may vary considerably and the pressure of the water supply to a urinal flushing system is commonly in the range 147 to 1000 $kN/m^2$. By suitable adjustment of the variable flow restricting device, a rate of flow through the valve 200 suitable for providing a desired fill rate of the cistern(s) can be provided by adjusting the length of the flow path therethrough. As previously mentioned, the covering characteristic of the covering means and the fact that it is possible to define a long groove in a comparatively small disc face is such that the device is suitable for use over such a broad range of operating pressures, there being no need to provide a number of different sizes of the device to cover such a range.

It will be readily appreciated that the variable flow restricting device may be made relatively compact, since the range of displacement of the device components required to provide a substantial variation in flow resistance is comparatively small and that the device may be readily incorporated into valve apparatus and fluid systems where variable flow restriction is required and economy of space is important.

It will also be understood that the device is comparatively simple and susceptible to economical and efficient manufacture. The disc 12, for example, may be produced by a casting or moulding technique. It has been found that where the groove defining part is manufactured of a plastics material such as acetal, a build-up of lime scale in hard water applications of the device is effectively prevented and therefore the disc may advantageously be produced by a plastics moulding process.

It will also be appreciated that instead of providing the groove means in a face of a discrete part such as the disc 12, where desired the groove means can be defined in a suitable face of a housing such as housing 30 or valve housing 202 as required. This can be of advantage where it is desired to produce apparatus including a variable flow restricting device with a smaller number of assembly steps.

I claim:

1. A variable flow restricting device comprising a part having groove means provided in a face thereof and through-passage means communicating with said groove means, covering means for engaging said face for covering said groove means to define flow path means which extend from said through-passage means in communication therewith, and means for providing relative displacement between said part and said covering means for causing resilient deformation of said covering means and/or said part to provide adjustably variable covering of said groove means such that said flow path means extends from said through-passage means to an extent which is adjustably variable according to said relative displacement, said covering means comprises a resiliently deformable member and a resilient membrane disposed between said deformable member and said face, said deformable member comprises a dome-shaped portion having a generally convex face directed toward said resilient membrane, said membrane includes a generally convex face directed toward said face of said part.

2. A device as claimed in claim 1, wherein the radius of curvature of said convex face of the deformable member is smaller than the radius of curvature of said convex face of said resilient membrane.

3. A device as claimed in 1, wherein said deformable member is mounted on a relatively rigid moveable member.

4. A device as claimed in 1, wherein said face of the part is flat.

5. A device as claimed in 1, wherein said groove means comprises a spiral groove extending radially outwardly from said through-passage means.

6. A device as claimed in 1, wherein said part is relatively rigid so as to be substantially non-deformable when the face thereof is engaged by said covering means.

7. A device as claimed in 1, wherein said part is fixedly mounted.

8. A device as claimed in 1, wherein said deformable member comprises a polymeric material.

9. A device as claimed in claim 8, wherein said material is a rubber.

10. A device as claimed 1, wherein said deformable member comprises means for mutually slideably engaging with said resilient membrane.

11. A device as claimed in claim 10, wherein said displacement providing means engages said moveable member.

12. A variable flow restricting device comprising a part having groove means provided in a face thereof and through-passage means communicating with said groove means, covering means for engaging said face for covering said groove means to define flow path means which extend from said through-passage means in communication therewith, and means for providing relative displacement between said part and said covering means for causing resilient deformation of said covering means to provide adjustably variable covering of said groove means such that said flow path means extends from said through-passage means to an extent which is adjustable variable according to said relative displacement, wherein said covering means comprises a resiliently deformable member and a resilient membrane disposed between said deformable member and said face, said deformable member being adapted to provide progressively increasing engagement with said membrane for pressing said membrane against said face for increasing the extent of said flow path means.

13. A device as claimed in claim 12 wherein said deformable member comprises a dome-shaped portion having a generally convex face directed toward said resilient membrane.

14. A device as claimed in claim 12 wherein said deformable member comprises means for mutually slidably engaging with said resilient membrane.

15. A device as claimed in claim 12 wherein said deformable member is mounted on a relatively rigid movable member.

16. A device as claimed in claim 12, wherein said deformable member comprises a polymeric material.

17. A variable flow restricting device including parts cooperable together to form an arcuate flow path extending from an inlet defined in at least one of the parts and means for progressively controlling the degree of cooperation between said parts for progressively varying the arcuate length of said flow path from said inlet, said controlling means comprising a deformable member adapted to spread in compression for progressively increasing said degree of cooperation between said parts and means for controllably applying a compressive force to said deformable member.

18. A variable flow restricting device comprising a rigid member having a flat face and a groove which extends inward from said flat face, said groove having an inlet at one end of said groove through which fluid flow is conducted into said groove and an elongated outlet opening formed in said flat face through which fluid flow is conducted from said groove, a resiliently deflectable flow control member having a side surface which is deflectable between a first condition and a second condition, said side surface of said flow control member being engageable with a small area on said flat face of said rigid member and a large arcuate area on said side surface of said flow control member being spaced from said flat face on said rigid member to enable said side surface on said flow control member to block fluid flow through a relatively short length of said outlet opening from said groove in said rigid member when said side surface of said flow control member is in said first condition, said side surface of said flow control member being engageable with a large area on said flat face of said rigid member and a small arcuate area on said side surface of said flow control member being spaced from said flat face on said rigid member to enable said side surface on said flow control member to block fluid flow through a relatively long length of said outlet opening from said groove in said rigid member when said side surface of said flow control member is in said second condition, and a fluid flow rate control device connected with at least one of said rigid member and said flow control member to effect relative movement between said members to vary the extent of deflection of said side surface of said flow control member between the first and second conditions.

19. A variable flow restricting device as set forth in claim 18 wherein said fluid flow rate control device includes a deformable actuator member adapted to spread in compression for progressively increasing the extent of deflection of said side surface of said flow control member from the first condition to the second condition.

20. A variable flow restricting device as set forth in claim 18 wherein said fluid flow rate control device includes a resiliently deformable actuator member, said resiliently deflectable flow control member being disposed between said resiliently deformable actuator member and said flat face of said rigid member, said resiliently deformable actuator member being adapted to provide progressively increasing engagement with said resiliently deflectable flow control member for pressing said resiliently deflectable flow control member against said flat face on said rigid member.

21. A variable flow restricting device as set forth in claim 18 wherein said elongated outlet opening formed in said flat face on said rigid member and through which fluid flow is conducted from said groove has a spiral configuration.

22. A variable flow restricting device as set forth in claim 18 wherein said fluid flow rate control device includes a resiliently deformable actuator member which is engageable with a side of said resiliently deflectable flow control member opposite from said side surface on said resiliently deflectable flow control member, and a drive member which is movable relative to said rigid member to deflect said side surface on said resiliently deflectable flow control member from the first condition to the second condition under the influence of force transmitted from said resiliently deformable actuator member to said resiliently deflectable flow control member.

23. A variable rate flow restricting device as set forth in claim 22 wherein said resiliently deformable actuator member comprises a dome-shaped portion having a generally convex face directed toward said side of said resiliently deflectable flow control member.

24. A variable rate flow restricting device as set forth in claim 23 wherein said side surface on said resiliently deflectable flow control member includes a generally convex face directed toward said flat face on said rigid member.

* * * * *